Nov. 3, 1925.

G. F. ROYER 1,559,915

METHOD OF AND APPARATUS FOR SEPARATING AND BLENDING MOLDERS' SAND

Filed July 7, 1922 4 Sheets-Sheet 1

Inventor
George F. Royer

By Cushman Bryant & Darby
Attorneys

Nov. 3, 1925.

1,559,915

G. F. ROYER

METHOD OF AND APPARATUS FOR SEPARATING AND BLENDING MOLDERS' SAND

Filed July 7, 1922     4 Sheets-Sheet 4

Inventor
George F. Royer

By Cushman Byrnes & Darby
Attorneys

Patented Nov. 3, 1925.

1,559,915

UNITED STATES PATENT OFFICE.

GEORGE F. ROYER, OF WILKES-BARRE, PENNSYLVANIA, ASSIGNOR TO ROYER FOUNDRY & MACHINE CO., OF WILKES-BARRE, PENNSYLVANIA, A CORPORATION OF PENNSYLVANIA.

METHOD OF AND APPARATUS FOR SEPARATING AND BLENDING MOLDERS' SAND.

Application filed July 7, 1922. Serial No. 573,408.

*To all whom it may concern:*

Be it known that I, GEORGE F. ROYER, a citizen of the United States, residing at Wilkes-Barre, in the county of Luzerne and State of Pennsylvania, have invented new and useful Improvements in Methods of and Apparatus for Separating and Blending Molders' Sand, of which the following is a specification.

The present invention relates to an improvement in method of an apparatus for treating granular material, being particularly adapted for preparing molders' sand for use.

In an earlier Patent No. 977,478, granted December 6, 1910, there is illustrated and described a machine or apparatus having features generally similar to some of those of the parts hereinafter described.

The present invention, however, is an improvement upon the method and apparatus of said patent and provides a means by which the grains of the sand for use in preparing molds may be disintegrated and separated from undersirable material and blended so as to be best adapted for the intended purpose.

Among the objects of the invention is the provision of a construction in which the action of gravity is employed as one element of the means employed for separating undesirable material from the fine granular particles which are separated from the mixed materials.

A further object of the improvements is to provide a very compact and readily portable apparatus having its parts so arranged and proportioned that a maximum amount of sand may be properly disintegrated and blended and any undesirable particles separated therefrom in a minimum amount of time.

In the accompanying drawings there is illustrated a form of the invention which has, by experience, been found to operate very satisfactorily and efficiently. However, there can, of course, be considerable variation as regards details of the particular embodiment illustrated without departing from the invention. The drawings are, therefore, to be considered as illustrative, rather than restrictive, of the invention, except where limitations to the particular details of the embodiment illustrated are incorporated in the claims of this specification.

In the accompanying drawings:—

Figure 1:
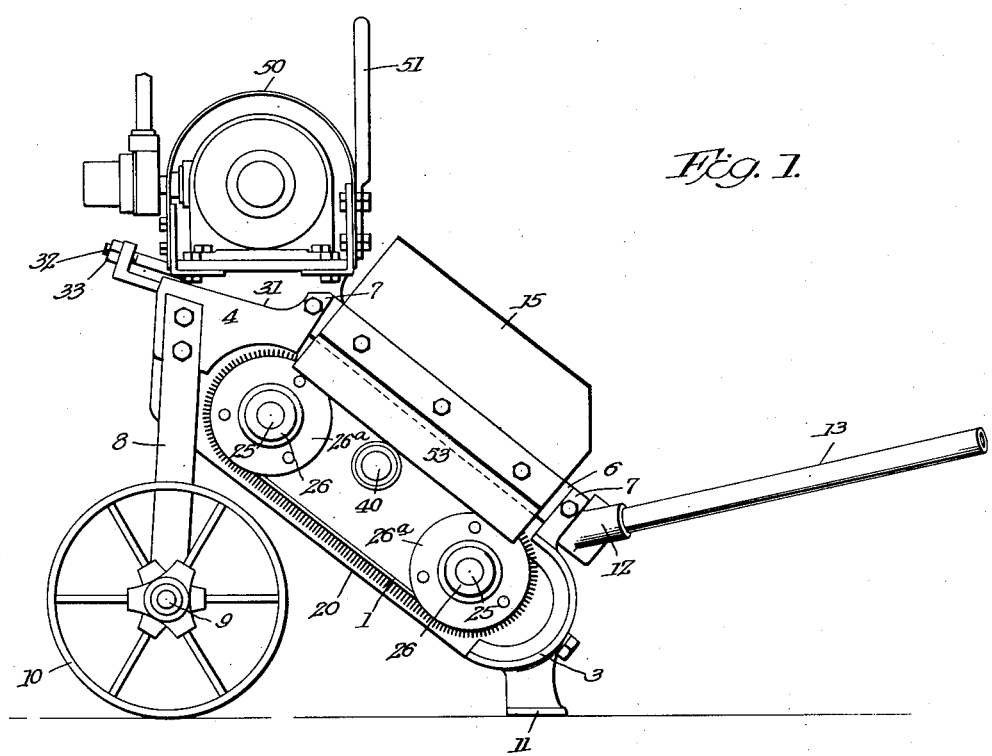
Fig. 1 is a side elevation of an apparatus constructed in accordance with the present invention.
Figure 2:
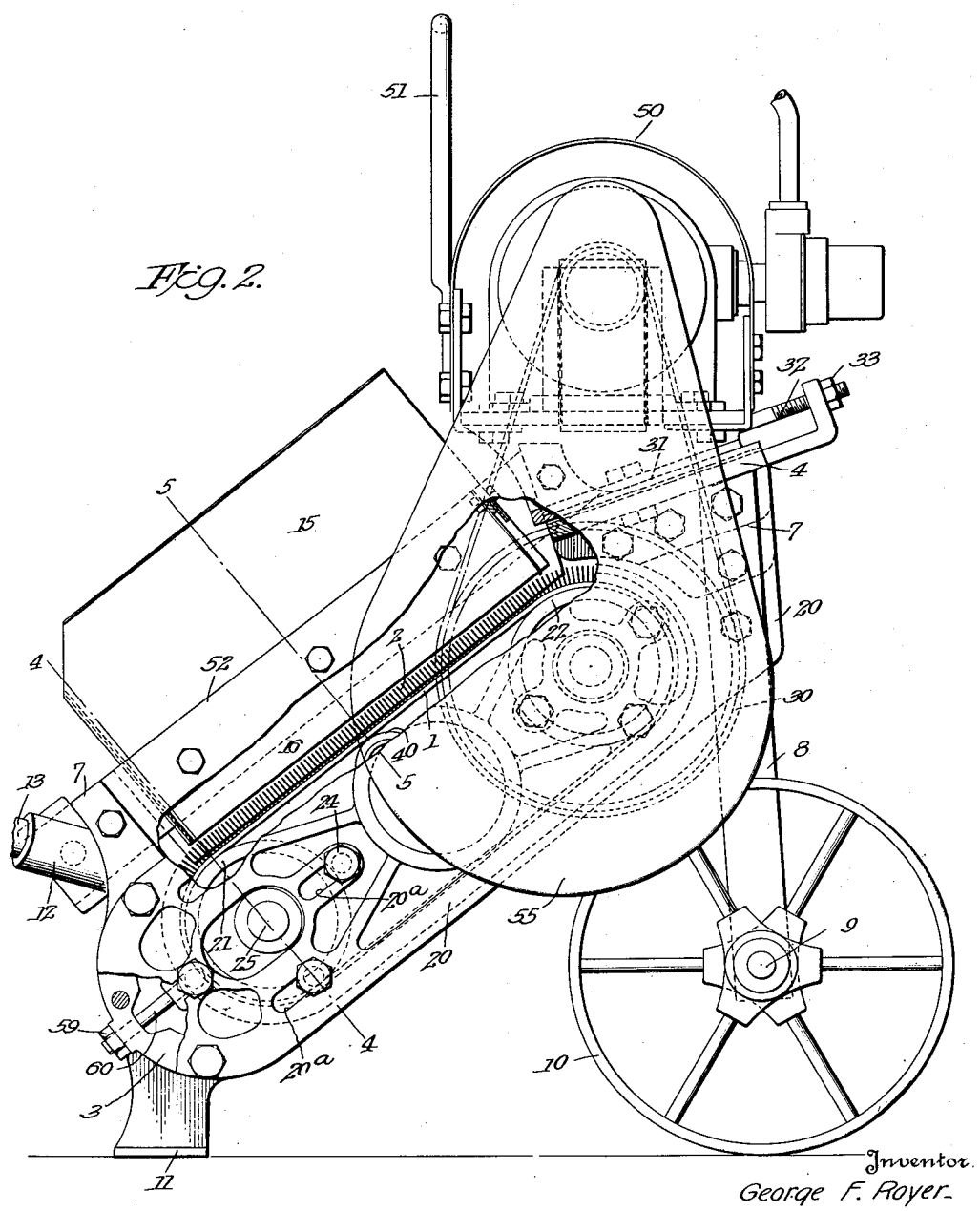
Fig. 2 is an elevation of the opposite side of the apparatus, part of the hopper and supporting frame being broken away.
Figure 3:
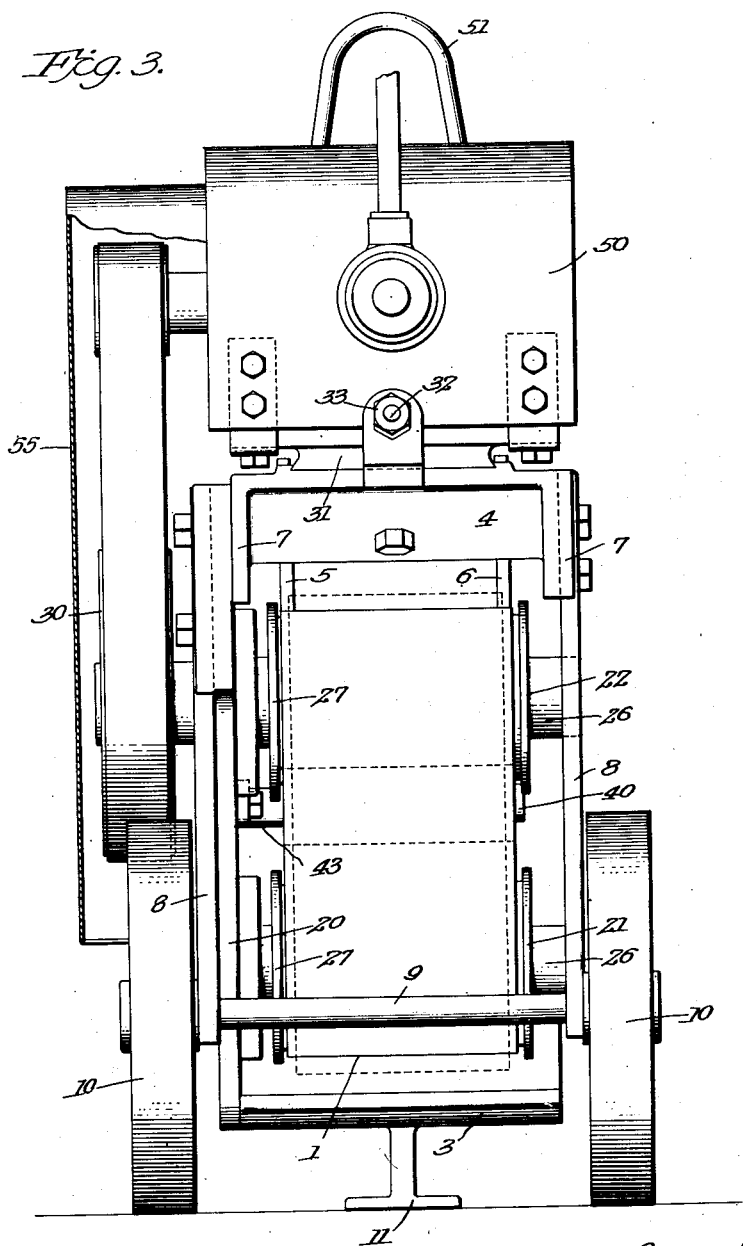
Fig. 3 is a rear elevation.
Figure 4:
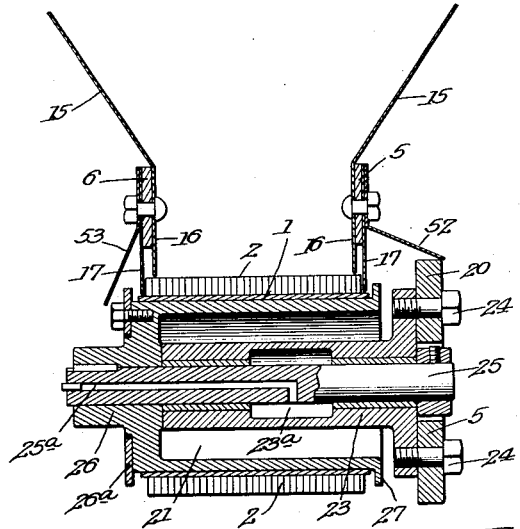
Fig. 4 is a section on the line 4—4 of Fig. 2.
Figure 5:
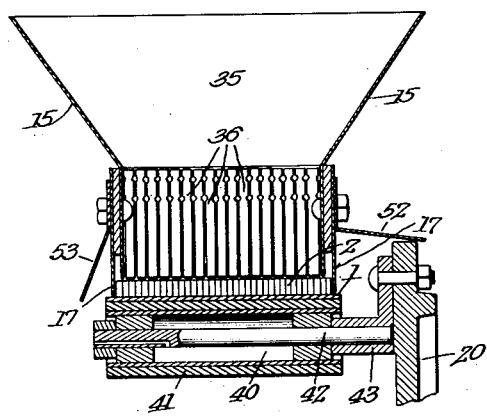
Fig. 5 is a section on the line 5—5 of Fig. 2.
Figure 6:
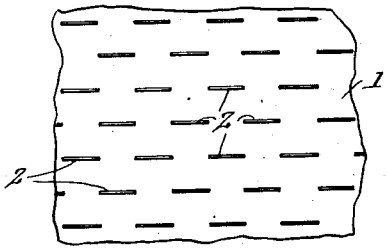
Figs. 6 and 7 are, respectively, a detail plan and section of the conveyor belt.

Referring to the drawings, wherein like reference characters designate corresponding parts in the several figures, it will be seen that the improved apparatus includes a flexible endless belt 1, which is supported on a suitable, vertically inclined frame and provided on its outer face with outwardly projecting sprigs or pins 2, which are spaced to provide a large number of cells or pockets adapted to collect small granular particles separated from a mass of material, such as sand, deposited on the belt.

Means are provided whereby as the endless belt is driven, portions of the material thereon which are not collected in the pockets or cells on the outer face of the belt are prevented from passing with the belt over the upper of the two supporting rolls on which the belt is mounted while the particles collected by the belt are automatically discharged as they pass over such upper supporting roll.

It will be seen that the inclination of the belt causes the mass or body of material deposited thereon to tend to move downward or in the opposite direction to the travel of the upper run of the belt, and this assists the sprigs or pins 2 in disintegrating lumps of the granular material into small particles and collecting the same.

The inclination of the belt also causes heavy, or undesirably large particles to move, by gravity, toward the lower end of the separator belt or away from the upper supporting roll which acts as a means for discharging the contents of the pockets or cells of the conveyor belt.

Various forms of supporting frames may be provided. The particular one illustrated comprises a foot casting 3, a head casting 4 and parallel side members 5, 6. As shown, the members 5, 6, are bolted to lugs 7 on the castings 3, 4, and to the latter and a plate connecting them at one side as hereinafter described are secured members 8, which, adjacent their lower ends, are provided with bearings for an axle 9, on which are secured ground wheels 10.

The foot casting 3 is shown as provided with a foot 11 which rests upon the ground. This acts to maintain the apparatus relatively stationary while in use, and yet by lifting the forward end slightly it may be readily moved from place to place on the wheels 10.

To assist in raising the lower, forward, end of the apparatus when it is desired to shift the position thereof or transport it from place to place the frame members 5, 6, are provided at their forward ends with sockets 12 into which handles 13 may be fitted.

Figure 7:
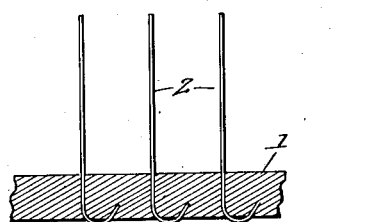

The pins or sprigs 2, are preferably, formed by suitable flat metal strips, which are passed through the body of the belt and have their lower ends bent upward or clinched into such body as represented at 2ʳ (Fig. 7). The sprigs are arranged with their longest diameter extending transversely of the body of the belt so that the flat faces thereof form the sides of the pockets or cells before referred to in which the small granular particles separated from the mass of material deposited on the belt are collected. This particular style of sprig or pin has been found to be practically superior to that which would be provided by using round pins.

To assist in guiding the material to be treated to the face of the separator belt and maintaining it from lateral displacement, use is made of a hopper 15 having flaring side walls which terminate at their inner ends in vertical portions 16 that extend downward across the inner faces of the frame members 5, 6.

As shown in the drawings, the belt 1 is of greater width than the space separating the frame members 5, 6, and at each side thereof there is a narrow strip or space on which there are no separating sprigs or pins 2.

The lower edges of the portions 16 of the side members of the hopper extend substantially to the plane of the outer ends of the sprigs or pins 2, but do not come into the path thereof. As a means for preventing possible escape of material laterally from the belt beneath the lower edges of the hopper members 16, it is preferred to secure to the outer face of each frame member 5, 6, a guard plate 17, the lower edge of which extends substantially to the outer surface of the body of the separator 1, overlapping the sprigs or pins 2.

The foot and head castings 3, 4, are further connected at one side by a plate 20 and to this plate are secured the bearings for the separator belt supporting rolls 21, 22.

The support for each of said rolls comprises a sleeve bearing 23, which is connected, by bolts 24, to the inner face of the plate 20 and extends inward transversely beneath the side frame members 5, 6. In this sleeve bearing is mounted a spindle 25, which is of such length that in the case of both the rolls 21, 22, it projects beyond the inner end of the bearing 23 and to said projecting end is keyed the hub 26 of the supporting roll. It will thus be seen that the bearing for the supporting roll is effectually covered so that the entrance of sand which might affect such bearing is prevented. A solid end hub 26 positively prevents sand escaping from the belt passing directly into the roll supporting bearing and at its opposite end the roll is provided with an annular flange 27 which projects beyond the face of the body of the belt 1. Any sand that might escape between the plates 16, 17, and the belt and pass over the flange 27 would have to travel the full length of the supporting sleeve 23 to gain access to the spindle bearing.

Within the sleeve 23 there may be provided an oil well 23ᵃ and lubricant can be supplied to this well by a channel or bore 25ᵃ in the body of the spindle.

An annular plate 26ᵃ is shown as attached to the hub 26, such plate being of a diameter substantially the same as that of the flange 27 at the opposite end of the belt 1 so that said belt is laterally confined between the flange 27 and plate 26ᵃ at both supporting rolls.

The spindle of the upper supporting roll is longer than that of the lower roll and to the portion thereof outside of the frame plate 20, there is secured a pulley 30, which is connected by a band with a drive pulley on the armature of an electric motor that is mounted on the head casting 4 outside of the hopper.

Preferably the upper end of the head casting 4 is provided with an inclined portion 31 and the motor frame has a correspondingly inclined portion engaging with said seat 31 so that by means of a screw 32 and nut 33 the motor frame may be slightly adjusted relative to the head casting to maintain the connecting belt properly taut.

The lower end wall of the hopper extends downward to substantially the plane of the outer ends of the sprigs or pins 2 and to the upper end hopper wall 35 are secured a series of flexible detents 36, which extend substantially to the plane of the outer ends of the sprigs or pins 2 and act to prevent material not contained in the cells or pockets formed between the sprigs 2 from passing with the belt over the upper belt supporting roll 22. These detents 36 are made of yielding or spring-like material to prevent any damage or injury to the sprigs or pins by a particle becoming lodged between them and such sprigs, but, assisted by the action of gravity as before explained, said detents will effectually prevent extra large particles from being carried over the upper supporting roll 22.

To prevent the upper, load-supporting, run of the separator belt from sagging during its travel between the rolls 21, 22, an auxiliary roll 40 is provided. This, as shown, comprises a hollow shell about which is secured a yielding or elastic cover 41. Said roll is supported on a spindle 42, which is mounted in a bearing 43 secured to the frame side plate 20, and, as is obvious, will act to maintain the upper run of the belt in a properly inclined position throughout its length.

The electric motor may be covered by a suitable shield 50 firmly attached to the framework and this may be provided with a bail 51 by which the apparatus may be suspended from a suitable crane to be moved from place to place, if desired. The machine may also be provided with laterally projecting guard plates 52, 53, and the driving connection between the motor and upper belt supporting roll 24 enclosed in a suitable housing 55.

To maintain the separating belt under proper tension the bolts 24 of the lower supporting roll 21 are preferably extended through slots 20ª in the frame plate 20, and the spindle 25 of said pulley also extends through a slot in said plate. By loosening the nuts on the bolts 24 and adjusting a nut 59 on a screw 60, the lower roll 21 may be bodily moved to properly tighten the separator belt should it stretch or become undesirably loose.

In using the apparatus the material to be treated is shoveled or conveyed into the hopper onto the upper surface of the separator belt which is driven at such a speed that any particular pocket or cell thereof will travel the full length of the hopper before it is completely filled. The sprigs or pins 2 exert a comb-like action on the lower surfaces of the material being treated and separate the desirably small particles therefrom and these are collected in the pockets provided on the belt. As each pocket travels the full length of the hopper, it will be seen that the apparatus acts to effectually blend or mix particles collected at various points in the length of the hopper before discharging them over the upper roll 22.

As before stated, the apparatus is particularly designed for treating molders' sand, and it is customary in preparing such sand to add a suitable amount of fresh or clean sand to sand that has been previously used in other molds. The fresh sand generally contains silicon, loam and clay, and while they are of granular construction, the separate ingredients are usually found together in masses of such proportions that the benefits of the thorough blending are not readily obtained, unless these grains are combed or separated into their granular form and thoroughly blended with the entire mass. In the used sand are found hard lumps that cling together, confining in the mass, gases, that it is very desirable to liberate, and frequently contain metal scrap and pieces undesirably large that should be separated from the blended mass. This is effected by the sprigs or pins 2 combing the granular material into separated grains and allowing them to gravitate into the pockets formed on the belt 1. The particles which are too large to enter the pockets formed by the members 2 are prevented by the members 36 from passing over the upper supporting roll 22 and gravitate to the lower end of the hopper from which they may be readily removed by a suitable scoop or shovel. The speed of the separator belt is such that as it passes over the upper roll 22 centrifugal force will act to throw or project the fine particles contained in the collecting pockets to a considerable distance through the air thus releasing the confined gases, aerating and introducing a maximum amount of oxygen into the clean sand.

It will be seen that the improved apparatus comprises a minimum number of parts and that all of the bearings which might be injured by sand coming in contact therewith are protected to a maximum degree, and the various driving mechanisms covered and protected so that they are not likely to be affected by the material treated or to injure an operative.

The apparatus is readily portable and is adapted for equally and effectively cleaning and preparing sand for general foundry use in a minimum amount of time. The machine will be equally effective in cleaning hot or cold sand.

Having thus described the invention, what is claimed is:—

1. The method of separating used molders' sand from undesired foreign matter and for purifying the separated sand which consists in depositing the mixed material upon a high speed inclined separating device and causing said foreign matter to move downwardly upon said device while desirable particles of sand are by action of the separating device carried upward and centrifugally thrown through the air from the upper end of said device to purify them.

2. The method of separating used molders' sand from undesired foreign matter and for purifying the separated sand which consists in depositing the mixed material upon a high speed inclined separating belt provided on its outer face with means for collecting particles of sand and causing said foreign matter to move downwardly upon the belt while desirable particles of sand collected by the belt are carried upward and centrifugally thrown through the air from the upper end of the belt.

3. The method of separating used molders' sand from undesired foreign matter and for purifying the separated sand which consists in depositing the mixed material upon a high speed inclined separating belt provided on its outer face with means for exerting a scraping action upon the material deposited thereon and collecting particles of sand separated by such scraping action, laterally confining the material deposited on the belt, and causing said foreign matter to move downwardly upon the belt while the particles of sand collected by the belt are carried upward and centrifugally thrown through the air from the upper end of the belt.

4. An apparatus for separating and purifying used molders' sand comprising an endless belt arranged in an inclined position and provided with means for separating particles of sand from other larger bodies supported above said sand upon the upper run of the belt, and means for driving said belt, the belt being so inclined and supported that the larger particles will move by gravity down the same and a stream of separated particles of sand will be unobstructedly discharged by centrifugal force from the upper end of the belt.

5. An apparatus for separating and purifying used molders' sand comprising an endless belt arranged in an inclined position and provided with means for separating particles of sand from other larger bodies supported above said sand upon the upper run of the belt, means for laterally confining a body of the material to be treated supported on the belt, and means for driving the belt, the belt being so inclined and supported that the larger particles will move by gravity down the same and a stream of separated particles of sand will be unobstructedly discharged by centrifugal force from the upper end of the belt.

6. In an apparatus for the purpose described, the combination of a suitable frame, means for supporting said frame in a vertically inclined position and including ground wheels so that the apparatus may be readily moved from place to place, an endless belt supported to travel beneath the frame and provided on its outer face with means for separating granular particles from material deposited on the belt as the belt travels longitudinally of the frame and collecting such separated particles, means for driving the belt, and means for preventing material not collected by the belt from being carried beyond the upper end of the frame, the particles collected by the belt being automatically discharged by the action of centrifugal force.

7. In an apparatus for the purpose described, the combination of a suitable frame provided with ground wheels by which it may be moved from place to place, two rolls mounted on the frame, a flexible belt supported by said rolls to travel in an upwardly inclined direction and provided on its outer face with means for separating granular particles from a body of material deposited on the belt and collecting the separated particles, a motor carried by the frame, gearing connecting the motor and one of said rolls to drive the belt, the separated particles collected by the belt being discharged by centrifugal force as the belt passes around the upper supporting roll, and means for preventing material not collected by the belt from passing over the discharge roll.

8. In an apparatus for the purpose described, the combination of a foot casting, a head casting, a wheeled support for the head casting, a frame connecting said castings and inclined upward from the foot casting to the head casting, two supporting rolls carried by the frame, a flexible belt extending about said rolls and provided on its outer face with means for separating granular particles from a body of material deposited on the belt, as the belt moves relative thereto, and collecting said separated particles, means for driving the belt, and means for preventing material not collected by the belt from passing over the supporting roll adjacent the head casting, the particles collected by the belt being discharged by centrifugal force as the belt passes around the upper supporting roll.

9. In an apparatus for the purpose described, the combination of a foot casting, a head casting, a wheeled support for the head casting, a frame connecting said castings and inclined upward from the foot casting to the head casting, two supporting rolls carried by the frame, a flexible belt extending about said rolls and provided on its outer face with means for separating granular particles from a body of material deposited on the belt, as the belt moves relative thereto, and collecting said separated particles, a motor mounted on the head casting and connected with the upper belt supporting roll, and means for preventing material not collected by the belt from passing over the upper supporting roll, the particles collected by the belt being discharged by centrifugal force as the belt passes around the upper supporting roll.

10. In an apparatus for the purpose described, the combination of a foot casting, a head casting, a wheeled support for the head casting, a handle connected to the foot casting, a frame connecting said castings and inclined upward from the foot casting to the head casting, two supporting rolls carried by the frame, a flexible belt extending about said rolls and provided on its outer face with means for separating granular particles from a body of material deposited on the belt, as the belt moves relative thereto, and collecting said separated particles, means for driving the belt, and means for preventing material not collected by the belt from passing over the supporting roll adjacent the head casting, the particles collected by the belt being discharged by centrifugal force as the belt passes around the upper supporting roll.

11. In an apparatus for the purpose described, the combination of a vertically inclined frame having at one end a wheeled support, belt supporting rolls carried by the frame adjacent the ends thereof, a flexible belt supported by said rolls and provided on its outer face with means for separating granular particles from a body of material deposited on the belt and collecting the separated particles, a motor mounted on the frame, means for driving the upper roll from the motor, and means for preventing material not collected by the belt from passing over the upper roll, the particles collected by the belt being automatically discharged as the belt passes around the upper roll.

12. In an apparatus for the purpose described, the combination of a frame comprising a foot casting, a head casting, and parallel frame bars connecting said castings, supports for the frame maintaining it in a vertically inclined position, a pair of roll spindles supported by the frame and extending transversely thereof beneath said parallel bars, a roll secured to each of said spindles, a flexible belt supported by said rolls and provided on its outer face with means for separating granular particles from a mass of material deposited on the belt and collecting the separated particles, means for driving the belt, and means for preventing material not collected by the belt from passing with the belt over the upper roll, the particles collected by the belt being automatically discharged as the belt passes over said upper roll.

13. In an apparatus for the purpose described, the combination of a frame comprising a foot casting, a head casting, and parallel frame bars connecting said castings, supports for the frame maintaining it in a vertically inclined position, a pair of roll spindles supported by the frame and extending transversely thereof beneath said parallel bars, a roll secured to each of said spindles, a flexible belt supported by said rolls and provided on its outer face with means for separating granular particles from a mass of material deposited on the belt and collecting the separated particles, a motor mounted on the frame and connected with the upper roll spindle, and means for preventing material not collected by the belt from passing over the upper roll, the particles collected by the belt being automatically discharged as the belt passes said upper roll.

14. In an apparatus for the purpose described, the combination of a frame comprising a foot casting, a head casting, and parallel frame bars connecting said castings, supports for the frame maintaining it in a vertically inclined position, tubular bearings secured at one end to the frame and extending laterally beneath the parallel bars thereof, a spindle mounted in each said bearing and projecting beyond the free end thereof, a roll surrounding each bearing and having a hub connected to the projecting end of the spindle, a flexible belt supported on said rolls and provided on its outer face with means for separating granular particles from a mass of material deposited on the belt and collecting the separated particles, means for positively rotating one of the spindles to cause the belt to travel longitudinally of the frame, and means for preventing material deposited on the belt and not collected thereby from passing over the upper roll, the particles collected by the belt being automatically discharged as the belt passes over said roll.

15. In an apparatus for the purpose described, the combination of a frame comprising a foot casting, a head casting, and parallel frame bars connecting said castings, supports for the frame maintaining it in a vertically inclined position, tubular bearings secured at one end to the frame and extending laterally beneath the parallel bars thereof, a spindle mounted in each said bearing and projecting beyond the free end thereof, a roll surrounding each bearing and having a hub connected to the projecting end of the spindle, a flexible belt supported on said rolls and provided on its outer face with closely adjacent outwardly projecting sprigs or pins adapted to separate granular particles from a mass of material deposited on the belt and forming pockets to collect the separated particles, means for driving the belt, and means for preventing material deposited on the belt and not collected in said pockets from passing over the upper roll, the pockets of the belt being automatically emptied as the belt passes over said upper roll.

16. In an apparatus for the purpose described, the combination of a vertically inclined frame, supporting rolls arranged near the upper and lower ends of said frame, a flexible endless belt supported by said rolls and provided on its outer face with means for separating granular particles from a body of material deposited on the belt and collecting the separated particles, a motor supported on the frame, a pulley on the motor shaft, a pulley on the spindle of one of the supporting rolls, a band connecting said pulleys, the tension of said band being varied by moving the motor bodily on the frame, and means for thus moving the motor.

17. In an apparatus for the purpose described, the combination of a frame comprising a foot casting, a head casting, and parallel frame bars connecting said castings, supports for the frame maintaining it in a vertically inclined position, a pair of supporting rolls extending transversely beneath the parallel frame bars, an endless flexible belt mounted on said rolls and provided on its outer face with means for separating granular particles from material deposited on the belt and collecting the separated particles, a hopper secured to said frame bars and confining the material deposited on the belt from movement downward or laterally thereof, means for driving the separator belt, and means for preventing material not collected by the belt from passing therewith over the upper roll, the particles collected by the belt being automatically discharged as the belt passes said upper roll.

18. In an apparatus for the purpose described, the combination of a frame comprising a foot casting, a head casting, and parallel frame bars connecting said castings, supports for the frame maintaining it in a vertically inclined position, a pair of supporting rolls extending transversely beneath the parallel frame bars, an endless flexible belt mounted on said rolls and provided on its outer face with closely adjacent sprigs or pins adapted to separate granular particles from a body of material deposited on the belt and forming pockets to receive the separated particles, the width of the belt being greater than the distance between the parallel frame bars, plates attached to said frame bars and extending substantially to the plane of the outer ends of the sprigs or pins on the belt, similar plates connected to said frame bars and extending at the sides of the rows of sprigs or pins, past the plane of the points thereof, substantially to the plane of the body of the belt, means for driving the separator belt, and means for preventing material deposited on the belt and not collected in said pockets from passing over the upper supporting roll, the pockets being automatically emptied as they pass said upper roll.

19. In an apparatus for the purpose described, the combination of a vertically inclined frame, a supporting roll adjacent each end of the frame, a flexible belt mounted on the rolls and having closely adjacent metal sprigs projecting from its outer face and forming pockets to receive granular particles separated from a body of material deposited on the belt by action of the sprigs thereon during relative movement between the belt and material, each sprig being rectangular in cross section with its greatest diameter parallel to the width of the belt, means for driving the belt, and means for preventing material deposited on the belt and not collected in the pockets thereof from passing over the upper supporting roll, the particles collected in the pockets being automatically discharged as they pass said upper roll.

20. As an article of manufacture a separator belt adapted to separate granular particles from a body of material deposited thereon as it is moved relative to such body comprising a flexible body, and a series of closely adjacent sprigs projecting from its outer face, each formed by a flat metal strip that extends through the flexible body.

21. As an article of manufacture a separator belt adapted to separate granular particles from a body of material deposited thereon as it is moved relative to such body comprising a flexible body, and a series of closely adjacent sprigs projecting from its outer face, each formed by a flat metal strip that extends through the flexible body, the greatest diameter of each sprig extending parallel to the width of the belt.

22. As an article of manufacture a separator belt adapted to separate granular particles from a body of material deposited thereon as it is moved relative to such body comprising a flexible body, and a series of closely adjacent sprigs projecting from its outer face, each formed by a flat metal strip that extends through the flexible body, the end of each sprig adjacent the inner face of the belt being clenched thereto.

23. In an apparatus for the purpose described, the combination of an endless flexible belt provided on its outer face with means for disintegrating granular material from a mass supported upon the belt, as the belt is moved relatively thereto, means for supporting the belt so that the upper run thereof travels in an upward inclined direction opposite that in which the material moves by the action of gravity, means for driving said belt and causing the particles collected thereby to be discharged therefrom by the action of centrifugal force, and means for preventing portions of the material not collected by the belt from being discharged with the collected particles.

In testimony whereof I have hereunto set my hand.

GEORGE F. ROYER.